Feb. 10, 1970   M. Y. A. M. SERRUYS   3,494,341
SUPPLY OF CARBURETTED GAS TO INTERNAL COMBUSTION ENGINES
Filed Dec. 29, 1967   3 Sheets-Sheet 1

INVENTOR

MAX YVES ANTONIN MARIE SERRUYS

BY Young & Thompson
ATTYS.

Feb. 10, 1970   M. Y. A. M. SERRUYS   3,494,341
SUPPLY OF CARBURETTED GAS TO INTERNAL COMBUSTION ENGINES
Filed Dec. 29, 1967   3 Sheets-Sheet 3

INVENTOR
MAX YVES ANTONIN MARIE SERRUYS
By Young & Thompson
ATTYS.

United States Patent Office 3,494,341
Patented Feb. 10, 1970

3,494,341
SUPPLY OF CARBURETTED GAS TO INTERNAL COMBUSTION ENGINES
Max Yves Antonin Marie Serruys, 102 Rue du Bac, Paris, France
Filed Dec. 29, 1967, Ser. No. 694,669
Claims priority, application France, Nov. 21, 1967, 128,961
Int. Cl. F02m 7/24, 23/08; F02f 9/00
U.S. Cl. 123—119           6 Claims

ABSTRACT OF THE DISCLOSURE

For the supply of carburetted air to internal-combustion engines, with the object of eliminating toxic elements from the exhaust gases, an admission of supplementary is provided downstream of the carburettor by an assembly A incorporated in the carburettor, the admission being regulated by a device actuated by an assembly B, separate from the assembly A and comprising a bellows subjected to the depression in the admission pipe and actuating in translation a cam with multiple profiles, driven in rotation in correspondence with the opening of the butterfly-valve of the carburettor. The cam can simultaneously actuate other regulating members.

---

The present invention relates to the supply of carburetted gas to internal combustion engines, and has for its object to reconcile the achievement of: a good variation of power as a function of the speed of rotation of the engine; an economy of fuel; and a reduced (or even negligible) emission of toxic products in the exhaust gases.

In order to obtain this result, devices have been proposed which provide for the introduction into the mixture of carburetted air of a measured quantity of supplementary air. The dosing of this additional air is regulated by the combined action of the opening of the butterfly-valve of the carburettor and of the depression downstream of the carburettor on a cam with a compound movement.

Other means have also been proposed, additional to the action of supplementary air, such as controlled heating of this air by the engine exhaust gases, wire-drawing of the carburetted mixture by suitable introduction of the supplementary air injected, automatic limitation of the closure of the butterfly-valve of the carburettor.

The admission and regulating members for the supplementary air or for limitation of the closure of the butterfly valve are generally grouped together in a unit arranged in the vicinity of the carburettor and of the coupling of this latter to the admission conduit of the engine. An arrangement of this kind is difficult to obtain for reasons of bulk and accessibility.

The invention provides a remedy for this drawback by dividing the equipment into two parts, one fixed to the carburettor and comprising the admission of supplementary air, the other separate from the carburettor and comprising the automatic regulation equipment, in particular the compound movement cam controlling the admission of supplementary air.

With this arrangement, the automatic regulation mechanism is no longer combined with the carburettor and can be mounted in any available position around or in proximity to the engine.

According to another particular feature, the cam which is simultaneously responsive to the rotation of the carburettor butterfly-valve and to the depression in the gas supply conduit and thus to two combined movements, is constituted by a device capable of sliding and rotating on the same cylindrical shaft.

In this form, the cam is simple to produce, is convenient in assembly and reliable in operation.

Figure 1:
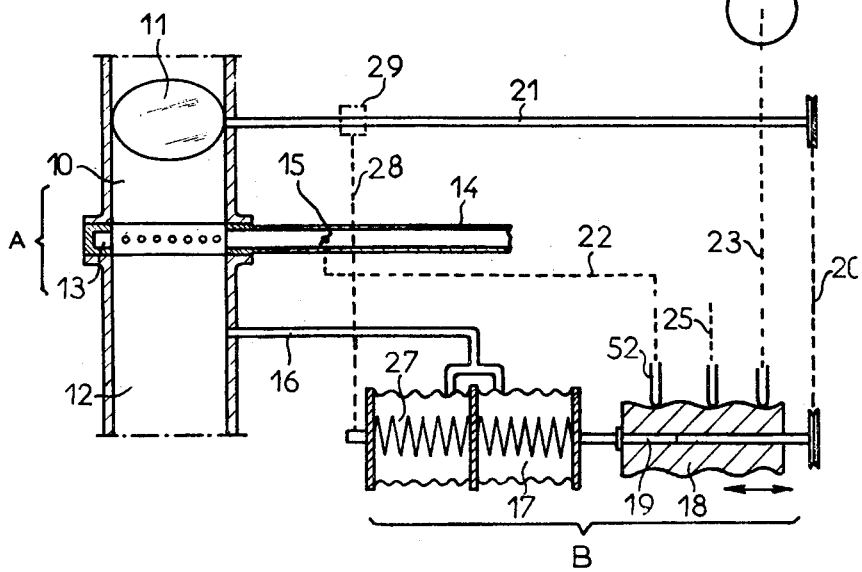
Figure 2:
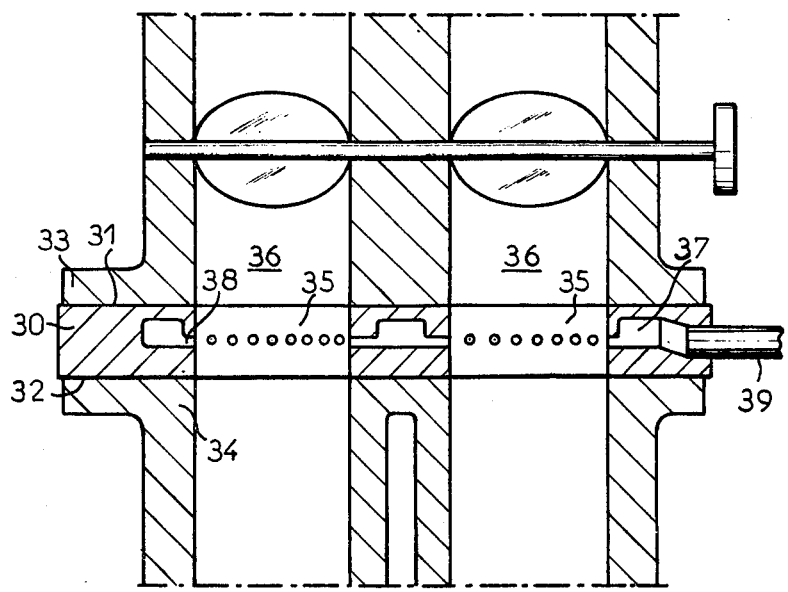
Figure 3:
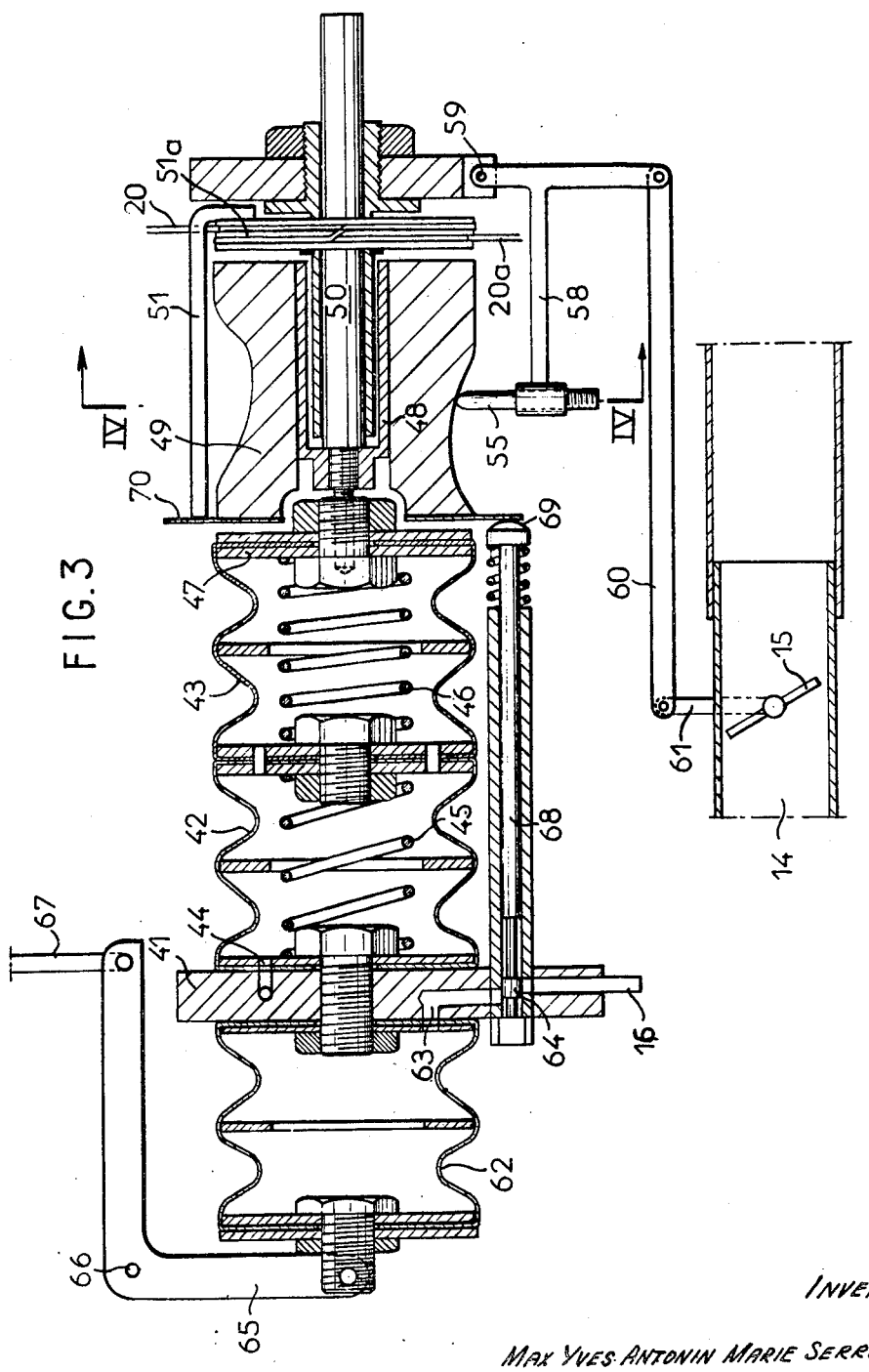
Figure 4:
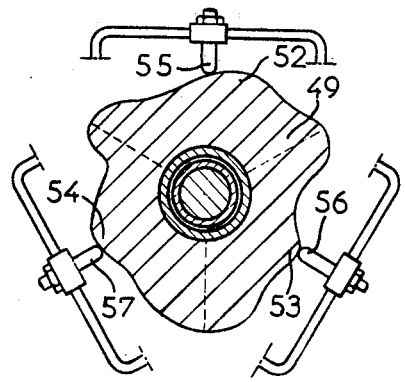
Figure 5:
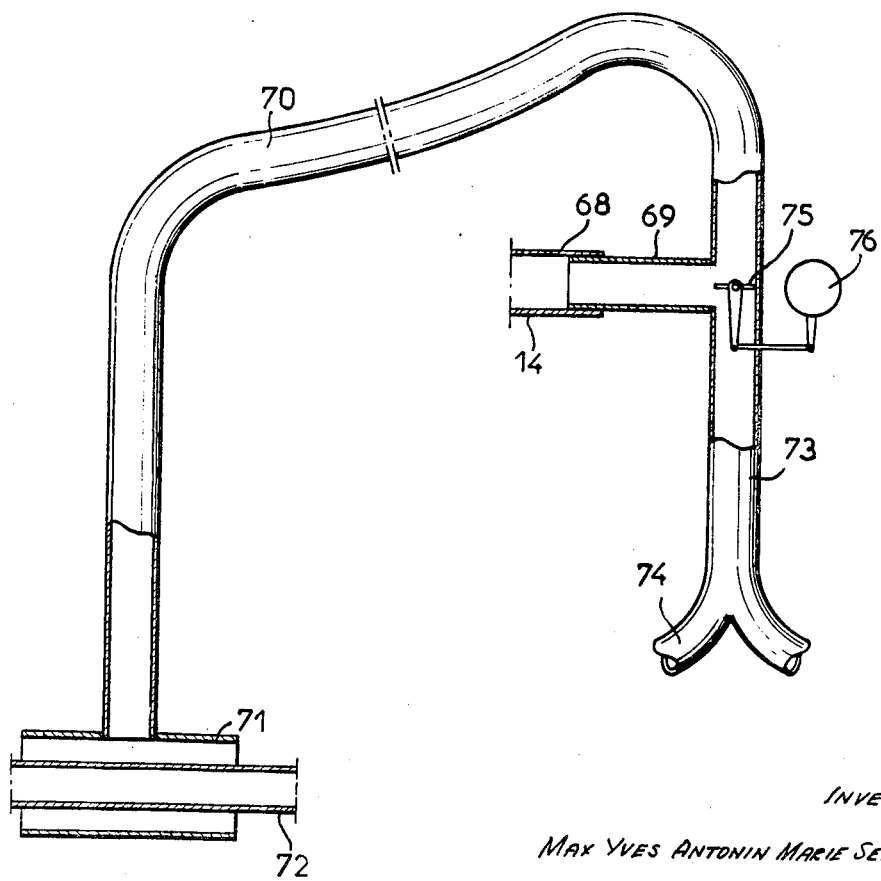

Other particular features and advantages of the device according to the invention will further be brought out in the description which follows below, reference being made to the accompanying drawings, in which:

FIG. 1 is a general diagrammatic view;
FIG. 2 shows in cross-section the part interposed between the carburettor and the admission pipe;
FIG. 3 is a view in cross-section of the control device by depression with its cam;
FIG. 4 is a view in cross-section of the cam, taken along the line IV—IV of FIG. 3;
FIG. 5 is a diagrammatic view of the supplementary air circuit.

In the diagrammatic arrangement of FIG. 1, there has been shown at 10 the outlet pipe of the carburettor in which is mounted the butterfly-valve 11, and at 12 the admission pipe for the carburetted mixture to the engine. In order to avoid the emission of toxic products in the exhaust gases, there is provided at 13, at the outlet of the carburetor, an introduction of supplementary air into the carburetted mixture. This flow of additional air thus introduced at 13 by a conduit 14 is regulated by an appropriate device 15, a valve or preferably a balanced butterfly-valve.

In order to achieve the desired effect, namely to eliminate the emission of toxic gas, this regulating device 15 is controlled, following a known technique, by a mechanism responsive simultaneously to the rotation of the carburettor butterfly-valve 11 and to the depression in the admission pipe 12, this depression acting through a conduit 16 so as to actuate a bellows 17, preferably provided with an internal expansion spring. This bellows 17 imparts a movement of translation to a cam 18 which can at the same time be given a movement of rotation on its shaft 19 by a coupling 20 with the shaft 21 of the butterfly-valve 11.

The cam 18, the displacements of which are coupled at the same time to the rotation of the butterfly-valve 11 and to the depression at 12, is arranged so as to act, throuugh a suitable transmission 22, on the adjustment of the butterfly-valve 15 controlling the admission of supplementary air.

Whereas in the prior devices, all the members indicated above are grouped together in a unit mounted between the carburettor and the admission pipe, the device according to the invention separates this unit into two separate elements A and B which are mounted independently of each other.

Only the element A, which comprises the admission 13 of supplementary air, is incorporated in the carburettor or is placed between the carburettor and the admission pipe.

The element B on the other hand, comprising the bellows 17, the cam 18 and their accessories, is separated from the element A and placed in any position left free by the engine, independently of the element A.

The cam 18, in addition to the control of the butterfly-valve 15, may have other functions useful for the result desired. By means of a transmission 23, it may in particular regulate the advance in the ignition system 24 of the engine. By another transmission 25, it can supply another adjustment recognized as useful to the correct operation of the engine considered, for example the regulation of a valve interposed in the air-heating circuit, or in the admission of fresh air to the crank case, or that of the shutters controlling in known manner the cooling of the radiator, or a control acting on the pitch of the helicoidal fan, etc.

With the bellows 17 in the unit B there is associated a further bellows 27 also preferably provided with an expansion spring, which, by the action of the depression provided at 16 produces a re-opening action on the butterfly-valve 11 when the depression exceeds a certain value, this action being effected by means of a transmission 28 and a control 29.

In this arrangement, the control members of the various regulating means, although separate from the element A incorporated in the carburetor and the admission pipe, form a grouped and compact assembly B which is easy to install.

The part 13 of small size, which constitutes the element A can be produced as shown in FIG. 2, in the form of a plate 30 with flat upper and lower faces 31 and 32 which are located between the base 33 of the carburetor and the admission pipe 34. This part 30 is thus arranged instead of the usual packing joint which separates the carburetor from the admission pipe.

This member 30 is pierced perpendicular to its faces with as many orifices 35 for the passage of carbureted gasses passing out of the carburetor as the latter itself comprises outlet orifices 36, and having the same diameter. Round each orifice 35 is provided an annular conduit 37 communicating with the said orifice by narrow holes or slots 38 which are uniformly distributed. The conduits 37 are coupled to an external conduit 39 for the supply of supplementary air.

The automatic regulation devices for the supplementary air are arranged at a different part B of the member 30, at which the necessary space is available without interfering with the other parts of the engine.

One form of construction of the element B is shown in FIGS. 3 and 4. It comprises a bellows in two parts 42, 43 fixed on a base-plate 41 and coupled at 44 to the admission pipe, being thus sensitive to the depression in this pipe (parts 17 and 16 of FIG. 1). The bellows 42, 43 is provided with internal opposing springs 45 and 46, preferably of unequal strengths. Its extremity 47 opposite to the base-plate is fixed to the support 48 of the cam 49 by a device such as a screw, which leaves the latter free to rotate.

The support 48 is carried on a shaft 50 so as to be able to slide on the shaft by the action of the bellows 42, 43. The support 48 and the cam 49 are driven by a finger 51 carried by a wheel 51a which is in turn set in rotation by a remote-control 20–20a, coupled for rotation with the butterfly-valve of the carburetor (coupling 19 of FIG. 1).

The cam 49 is cut in such manner as to form successive profiles, for example three in number, 52, 53 and 54, with which are respectively in contact three feelers 55, 56 and 57 (see FIG. 4).

The feeler 55 actuates a crank-arm 60 by a lever 58 pivoted at 59, the crank-arm driving a crank 61 fixed to the small butterfly-valve 15 which regulates the flow of supplementary air through the conduit which brings it downstream of the carburetor (parts 13 and 14 of FIG. 1, or parts 30 and 39 of FIG. 2).

By means of an appropriate transmission, the feeler 56 controls the setting of the ignition distributor (coupling 23, 24 of FIG. 1).

The feeler 57 acts through an appropriate transmission to regulate any accessory factor of operation of the motor which may be considered desirable (coupling 25 of FIG. 1).

The bellows controlled by the depression is preferably made in two parts 42 and 43, which comprise oppositely-acting springs 45 and 46. These springs are of different strengths. The first spring 45 is provided so as to be completely contracted by a fairly small depression in the conduit 16 (FIG. 1), for example less than 100 g./sq. cm. The second spring 46 is only completely contracted by greater depressions, of the order of 600 to 700 g./sq. cm.

On the base-plate 41 is fixed a depression servo-motor, for example a bellows 62 actuated by the depression in the conduit 63, coupled to the conduit 16 through the intermediary of a control slide-valve 64. By means of a lever 65 pivoted on the shaft 66 and the crank-arm 67, the bellows 62 limits the closure of the butterfly-valve 11 of the carburetor. The slide-valve 64 is rigidly fixed on a rod 68, the extremity 69 of which can come into contact with a disc 70 rigidly fixed to the cam 49.

It can be seen that when the depression reaches a large value in the double bellows 42, 43, the disc 70 pushes back the head 69 of the rod 68. This latter opens the slide-valve 64 which ensures that the bellows 62 is put into communication with the conduit 16 receiving the depression of the admission pipe 12.

By the effect of this depression, the bellows actuates the unit 65, 67 which ensures the limitation of the displacement of the butterfly-valve 11 of the carburetor.

The admission conduit for supplementary air can be supplied directly with free air. However, it may also be supplied with advantage with heated air, if necessary carrying away the gases from the crank-case.

This arrangement is shown diagrammatically in FIG. 5.

In this arrangement, the conduit 14 for supplementary air (FIGS. 1 and 3) or 39 (FIG. 2), is coupled by a flexible junction 68 to a T-conduit 69.

One arm 70 of this T is connected to an air heater formed by a sleeve 71 surrounding the exhaust pipe 72 of the engine. The other arm 73 of the T pipe receives at 74, in addition to the ambient air, the gases from the crank-case and, when so desired, from the petrol tank. At the junction of the arms of the T is arranged a regulating butterfly-valve 75 actuated by a thermostat 76.

When the engine is working normally, that is to say when it drives the vehicle or when it is idling on no-load, the opening of the butterfly-valve 15 of the carburettor and the depression existing in the admission pipe downstream of this latter have well-determined values for each speed of operation of the engine, to which values there corresponds an also well-determined position of the cam-carrier member 49.

It is therefore only necessary to have determined, during previous tests on the ordinary bench or on the roller bench, the opening of the butterfly-valve 15 which regulates the flow of supplementary air, and the setting of the ignition distributor 26 which, for every condition of operation of the engine, give the result which is considered most satisfactory from the point of view of output, specific consumption and emission of toxic compounds by the engine, and to have given to each of the cams 52, 53, 54, the desired profile in order that the corresponding feelers produce the optimum regulation deduced from these tests, so as to be certain that the apparatus will achieve automatically and at any moment the conditions of carburation and advance of ignition which have been found by experiment to be the most satisfactory.

The gases from the crank-case and the gasoline tank are mixed with the supplementary air and re-admitted to the engine, so that the only toxic products emitted by the engine will be those which could remain in the exhaust gases (in spite of the addition of air effected by the apparatus, the dosing of which can precisely be regulated so as to reduce them to the smallest possible value).

If the regulation and the action of the thermostat 76 are correctly carried out, it is furthermore obviously possible to arrange matters so that the temperature variations at the inlet of the air filter and the temperature variations of the engine (temperature of the water or of the exhaust pipe, for example) have no effect on the value of the flow of supplementary air which gives the best results for a given speed of rotation and output of the engine, so that the regulations automatically effected by the device remain the best in spite of these variations of ambient temperature and engine temperature.

When the engine is driven by the vehicle (or by its own inertia), any excessive closure of the carburettor butterfly-valve tends to create an excessive depression in the admission pipe (in any case greater than at idling speed) and this depression moves the cam carrier member far enough for the disc 70 which it carries at its extremity to actuate the slide-valve 64 of the servo-motor 62, in such manner as to cause the operation of this servo-motor in the direction which tends to re-open the butterfly-valve (or at least to prevent it from being completely closed).

By this mechanism, the device according to the invention prevents the depression existing in the admission pipe from falling to a value which is too low for good combustion, and eliminates the emission of hydrocarbons which may result.

In addition, and under the same conditions, the cam 49 actuating the ignition distributor 26 (or a second servo-motor supplied by the same slide-valve as that which acts on the butterfly-valve of the carburettor) displaces this distributor in the direction of retard so as to prevent a troublesome reduction of the braking due to the engine.

In the above description, the cam 49 has been shown in FIG. 4 as comprising three parts 52, 53 and 54, each covering a sector slightly less than 120°. If the cam only acts on two feelers, its rotation is limited to 180°. If a single feeler is provided, the cam can make a complete revolution of slightly less than 360°.

It is however possible to maintain a complete rotation of 360° with two or three feelers by displacing the feelers 55, 56, 57 over the length of the cam 49 and giving each of them an appropriate length of this cam (see FIG. 1).

For purposes of simplification, instead of effecting the regulation of the ignition advance (by rotation of the usual ignition device 24 about its axis), by means of one cam, one feeler and one flexible transmission 23, there may be arranged at the side of the ignition device 24 a depression motor (for example a bellows similar to the bellows 62 but provided internally with an opposing spring) and causing this depression motor (and therefore the interior of this bellows) to communicate with the conduit 63 which already transmits to the bellows 62 the depression which arrives through the conduit 16 under the control of the slide-valve 64. With this arrangement, the larger depressions which tend to be produced during deceleration or when the engine is driven by the vehicle, not only act through the intermediary of the bellows 62 and the members 65, 66 and 67 to cause a re-opening of the butterfly-valve which prevents these depressions from becoming excessive, but also simultaneously produce a reduction in advance of the ignition such that the braking effect of the engine is not too much reduced by the limitation of closure of the butterfly-valve in question.

It will of course be understood that the arrangements described and shown have no limitative nature and may comprise various alternative forms in their construction, especially for the purpose of simplification, by the elimination of certain couplings to their parts. All the alternative forms which dissociate the admission of supplementary air incorporated with the carburettor or associated therewith from the devices for controlling the regulation of this supplementary air remain within the scope of the present invention.

What I claim is:
1. In an internal combustion engine having:
   an engine admission pipe,
   a carburettor butterfly valve in said pipe,
   means for introducing supplementary air in said pipe downstream of said valve,
   said means being controlled by opening of said valve and by pressure drop in said pipe,
   a control assembly comprising:
   a fixed frame,
   a body mounted rotatably about an axis and mounted on said frame for rectilinear movement along said axis and having at least one cam surface,
   first actuating means responsive to said valve opening position and adapted to rotate said body about said axis,
   second actuating means responsive to pressure drop in said pipe and adapted to move said body rectilinearly along said axis,
   said second actuating means having:
   bellows means coaxial with said axis of said body and having one of its ends fixed to said frame and its other end connected with said body,
   said bellows means defining an inner fluid-tight space communicating with said pipe so as to be retracted along said axis as a function of pressure drop in said pipe,
   spring means associated with said bellows means and tending to expand said bellows means along said axis, and
   at least one cam follower cooperating with said cam surface of said body and controlling said means for introducing supplementary air in said pipe.

2. A control assembly as claimed in claim 1 wherein said bellows means has two bellows in series and said spring means has two springs of different strengths associated with said two bellows respectively.

3. A control assembly as claimed in claim 1 wherein an additional bellows has one of its ends fixed to said frame opposite to and coaxial with said bellows means and defines an inner fluid-tight space communicating with said pipe, said additional bellows having its other end operatively connected with said valve so as to increase said valve opening when said pressure drop reaches a predetermined valve.

4. A control assembly as claimed in claim 3 wherein said inner space of said additional bellows communicates with said pipe through the intermediary of a valve means actuated by said bellows means.

5. A control assembly as claimed in claim 1 wherein said engine has an ignition system and said body has a second cam surface, and a second cam follower cooperating with said second cam surface and being adapted to modify advance of said ignition system.

6. A control assembly as claimed in claim 1 wherein said body has a plurality of cam surfaces associated respectively with cam followers operatively connected with regulating means for regulating operation of the engine.

References Cited

UNITED STATES PATENTS

| | | | |
|---|---|---|---|
| 3,190,275 | 6/1965 | Serruys | 123—124 |
| 3,150,649 | 9/1964 | Hebbard. | |
| 2,944,646 | 7/1960 | Willmer. | |
| 2,553,896 | 5/1951 | Coquille. | |
| 2,129,608 | 9/1938 | Vanderpoel. | |
| 2,100,466 | 11/1937 | Bashford et al. | |
| 1,916,257 | 7/1933 | Dubina | 123—124 |
| 1,761,692 | 6/1930 | Stepp. | |

AL LAWRENCE SMITH, Primary Examiner

U.S. Cl. X.R.

123—41.86, 97, 122, 124